(12) United States Patent
Ike et al.

(10) Patent No.: US 6,308,525 B1
(45) Date of Patent: Oct. 30, 2001

(54) DEHUMIDIFICATION APPARATUS

(75) Inventors: Hidetoshi Ike; Yasushi Ishikawa; Kazunari Kakuta, all of Yokohama (JP)

(73) Assignee: Kankyo Co., Ltd., Kanagawa (JP)

( * ) Notice: Subject to any disclaimer, the term of this patent is extended or adjusted under 35 U.S.C. 154(b) by 0 days.

(21) Appl. No.: 09/584,857

(22) Filed: Jun. 1, 2000

(30) Foreign Application Priority Data

Jun. 1, 1999 (JP) .................................................. 11-154296

(51) Int. Cl.[7] ...................................................... F25D 23/00
(52) U.S. Cl. ...................................... 62/271; 62/94; 62/93
(58) Field of Search .................................. 62/94, 93, 271

(56) References Cited

U.S. PATENT DOCUMENTS

| | | | | |
|---|---|---|---|---|
| 5,022,241 | * | 6/1991 | Wilkinson | 62/271 |
| 5,301,439 | * | 4/1994 | Wang | 96/125 |
| 5,632,954 | * | 5/1997 | Coellner et al. | 422/4 |
| 5,817,167 | * | 10/1998 | DesChamps | 95/113 |
| 5,937,667 | * | 8/1999 | Yoho, Sr. | 62/271 |
| 6,050,100 | * | 4/2000 | Belding et al. | 62/271 |
| 6,094,835 | * | 8/2000 | Cromer | 34/80 |
| 6,178,762 | * | 1/2001 | Flax | 62/271 |

* cited by examiner

Primary Examiner—William Doerrler
Assistant Examiner—Mark Shuman
(74) Attorney, Agent, or Firm—Birch, Stewart, Kolasch & Birch, LLP

(57) ABSTRACT

A dehumidification apparatus which retains a high dehumidification ability is disclosed. The dehumidification apparatus comprises a container having at least one air inlet and at least one air outlet, and has an upper plate covering the container; a fan driven by a motor, which introduces air into the container from the air inlet and discharges air from the container through the air outlet so that air flow passing through the container is formed; and a holder for holding deliquescent dehumidification agent. The holder is contained in the container, which holder has at least one downwardly tapered compartment in which the deliquescent dehumidification agent is held. The deliquescent dehumidification agent held in the compartment contacts the air flow via through holes through which water and air can pass but the deliquescent dehumidification agent cannot pass, which through holes are formed in outer boundary of the compartment.

9 Claims, 11 Drawing Sheets

DEHUMIDIFICATION APPARATUS

BACKGROUND OF THE INVENTION

I. Field of the Invention

The present invention relates to a dehumidification apparatus.

II. Description of the Related Art

Various dehumidification apparatuses utilizing deliquescent dehumidification agents such as calcium chloride are known. As a typical example of this type of known dehumidification apparatuses, the dehumidification apparatus described in Japanese Laid-open Patent Application (Kokai) No. 10-192641 will now be described referring to FIG. 15.

The known dehumidification apparatus 100 shown in FIG. 15 comprises a container 101 and a cover 102 enclosing an electric fan 115. On the bottom 101a of the container, granular deliquescent dehumidification agent D such as calcium chloride which absorbs moisture in the air is laid.

The container 101 is closed except for an opening 104 formed in the upper portion of the container 101. A cap 106 having a vertically extending cylindrical air-introducing duct 105 is mounted on the container 101 such that the cap 106 covers the opening 104.

The cover 102 comprises a cylindrical air-discharging duct 110 which vertically extends and coaxially nested in the air-introducing duct 105. The distal end of the air-discharging duct 110 protrudes from the distal end of the air-introducing duct 105. The cover 102 includes a lower cover 113 having an air inlet 112 which communicates with an air-introducing passage 111 formed between the outer surface of the air-discharging duct 110 and the inner surface of the air-introducing duct 105. The cover 102 has an upper cover 116 having an air outlet 114 which communicates with the inner side of the container 101 through the air-discharging duct 110. The upper cover 116 harbors the electric fan 115 and a battery 117 which gives the power to drive the fan 115.

In operation, the fan 115 is driven. As a result, air is drawn through the air inlet 112 and the air-introducing passage 111 into the inside of the container 101. The air is then discharged from the apparatus from the air outlet 114 through the air-discharging duct 110. Since the air contacts the deliquescent dehumidification agent D on the bottom of the container, the moisture contained in the air is absorbed by the deliquescent dehumidification agent D and the air is dried. On the other hand, the absorbed moisture is converted to deliquesced liquid and accumulated on the bottom 101a of the container 101.

With this conventional dehumidification apparatus, since the deliquescent dehumidification agent placed on the bottom of the container is immersed in the deliquesced liquid accumulated on the bottom of the container, the dehumidification ability of the dehumidification apparatus is decreased very much by the accumulation of the deliquesced liquid.

Japanese Laid-open Patent Application (Kokai) No. 2-227115 proposes to separate the deliquescent dehumidification agent D and the deliquesced liquid by harboring the deliquescent dehumidification agent D on a porous plate arranged on the upper portion of the container 101 so that the deliquesced liquid drops onto the bottom 101a of the container through the pores formed in the porous plate. Since the deliquescent dehumidification agent D is separated from the deliquesced liquid and so can be kept relatively dry, the ability to absorb moisture is kept high.

However, in both of the above-described known dehumidification apparatuses, as shown in FIG. 15, the air-introducing duct 105 and the air-discharging duct 110 are nested, so that only a small portion of the deliquescent dehumidification agent can contacts the air. As a result, the dehumidification efficiency of the apparatus is low.

SUMMARY OF THE INVENTION

Accordingly, an object of the present invention is to provide a dehumidification apparatus which retains a high dehumidification ability.

The present inventors intensively studied to discover that this object may be attained by holding the deliquescent dehumidification agent in a downwardly tapered compartment whose outer boundary has a plurality of through holes through which water and air can pass but said deliquescent dehumidification agent cannot pass.

That is, the present invention provides a dehumidification apparatus comprising: a container having at least one air inlet and at least one air outlet, and has an upper plate covering the container; a fan driven by a motor, which introduces air into said container from said air inlet and discharges air from said container through said air outlet so that air flow passing through said container is formed; a holder for holding deliquescent dehumidification agent, which holder is contained in said container, which holder has at least one downwardly tapered compartment in which said deliquescent dehumidification agent is held, said deliquescent dehumidification agent held in said compartment contacts said air flow via through holes through which water and air can pass but said deliquescent dehumidificatin agent cannot pass, said through holes being formed in outer boundary of said compartment.

With the dehumidification apparatus according to the present invention, the deliquescent dehumidification agent is held in one or more compartments which are downwardly tapered. Since each compartment is downwardly tapered, the lower the position in the compartment, the smaller the amount of the deliquescent dehumidification agent held at the position, and in turn, the larger the surface area per a unit volume of the dehumidification agent. Therefore, the deliquescent dehumidification agent held at the bottom region of the compartment is firstly lost by deliquescence, so that a hollow region is formed at the bottom region of the compartment. When this occurs, since the compartment downwardly tapers, and since the deliquescent dehumidification agent granules are agglutinated each other by small degree of deliquescence, the deliquescent dehumidification agent held at the region upper than the hollow bottom region is continuously held at its original position even though the region under the held deliquescent dehumidification agent is hollow. Thus, the deliquescent dehumidification agent held in the compartment is above the deliquesced liquid accumulated on the bottom of the container. When the deliquesced liquid is accumulated to a higher level by deliquescence of the deliquescent dehumidification agent, since the deliquescent dehumidification agent is lost from the lowest position thereof, the lowest portion of the deliquescent dehumidification agent is still kept higher than the raised level of the deliquesced liquid. Thus, the deliquescent dehumidification agent held in the compartment is always retained above the upper surface of the deliquesced liquid accumulated on the bottom of the container. Therefore, the dehumidification ability of the apparatus is kept high.

Further, since the deliquescent dehumidification agent held in the compartment is always retained above the upper surface of the deliquesced liquid accumulated on the bottom of the container by virtue of the downward tapered shape of the compartment, the entire height of the container may be effectively utilized for holding the deliquescent dehumidification agent. That is, the compartment may extend over substantially the entire height of the container. Therefore, the inner space of the container may be effectively utilized, so that the dehumidification ability of the apparatus is high, or the apparatus can be made compact when compared with a conventional apparatus having the same dehumidification ability.

Figure 2:
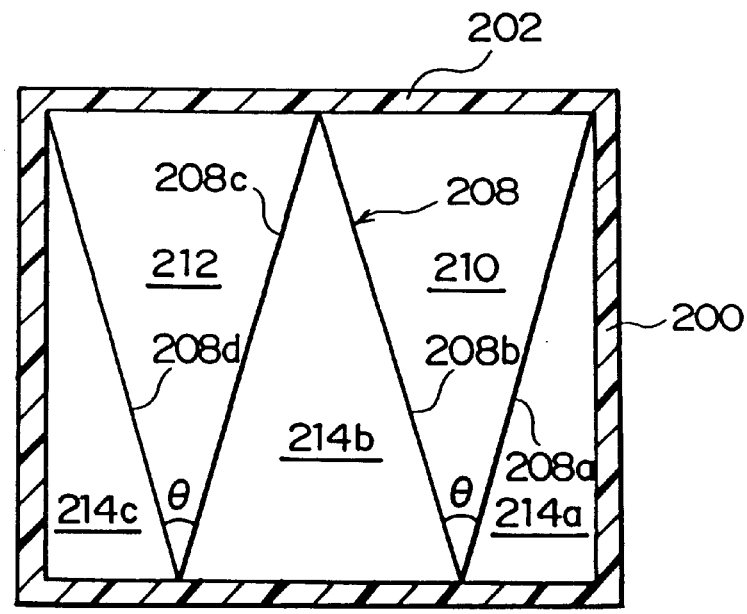
FIG. 2 is a schematic cross sectional side view of the container of the dehumidification apparatus according to the preferred embodiment of the present invention shown in FIG. 1, cut along the 2–2' line shown in FIG. 1.

The container 200 contains a holder 208 for holding deliquescent dehumidification agent D. The deliquescent dehumidification agent D is not shown in FIG. 2 for the purpose of simplicity but shown in FIG. 3. The deliquescent dehumidification agent D may preferably be granular calcium chloride as the conventional dehumidification apparatuses, but may be a solid deliquescent dehumidification agent. The holder 208 comprises first to fourth slant plates 208a, 208b, 208c and 208d. Each of these plates has a plurality of through holes through which water and air can pass but the deliquescent dehumidification agent cannot pass. The plates 208a–208d may be plastic nets. Alternatively, the through holes may be in the form of slits. The four slant plates 208a–208d are arranged along the direction of the air flow such that the cross section thereof when viewed from the direction of the air flow (i.e., the cross section shown in FIGS. 2 and 3) is W-shaped as shown in FIG. 2. That is, the upper end of each plate is attached to the upper plate 202 and the lower end of each plate is attached to the bottom of the container 200. Further, the lower ends of the plates 208a and 208b contact each other and the lower ends of the plates 208c and 208d contact each other.

By the first plate 208a and the second plate 208b, a downwardly tapered first compartment 210 is defined. By the third plate 208c and the fourth plate 208d, a downwardly tapered second compartment 212 is defined. The deliquescent dehumidification agent is held in the first and second compartments 210 and 212.

Figure 14:
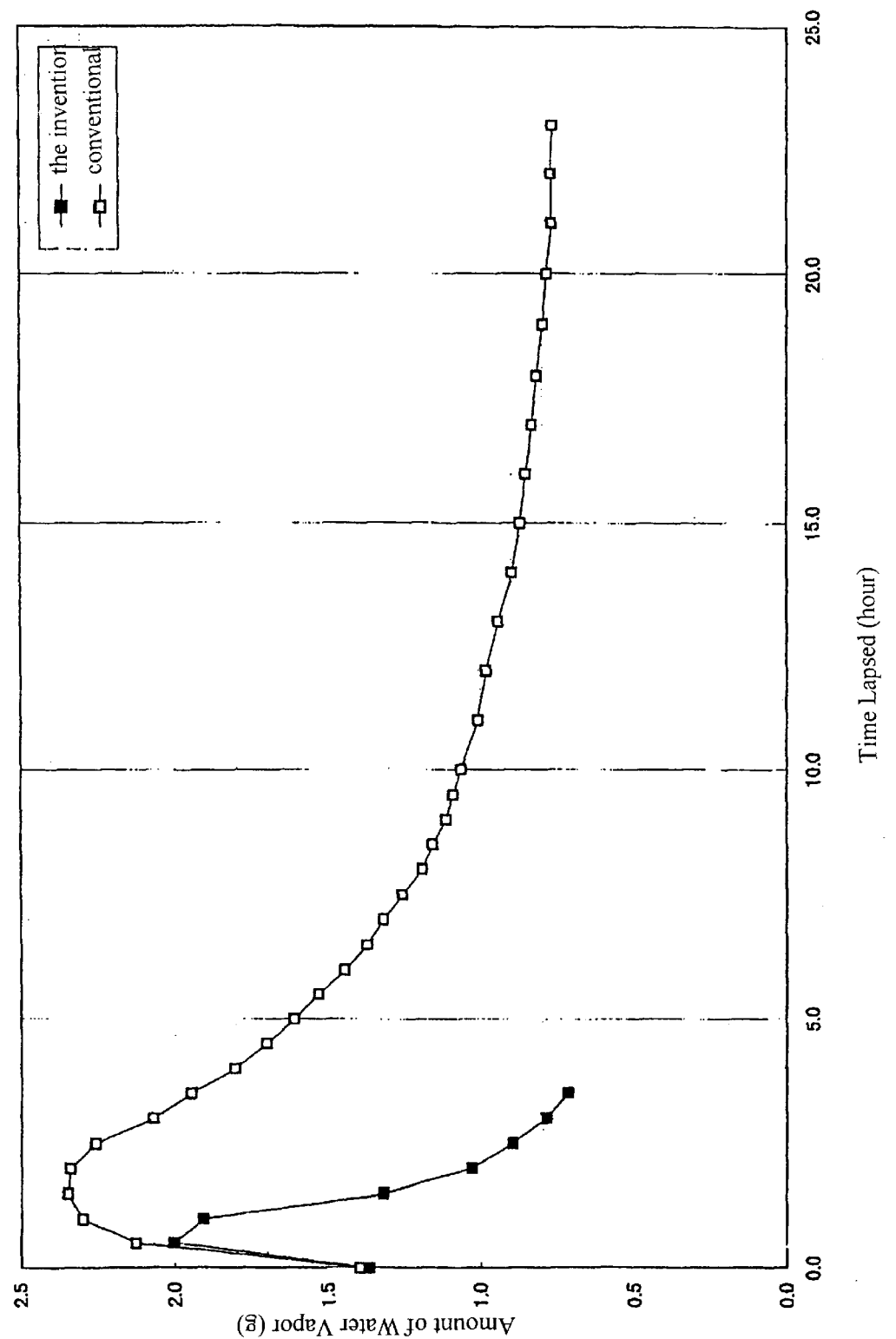
Figure 15:
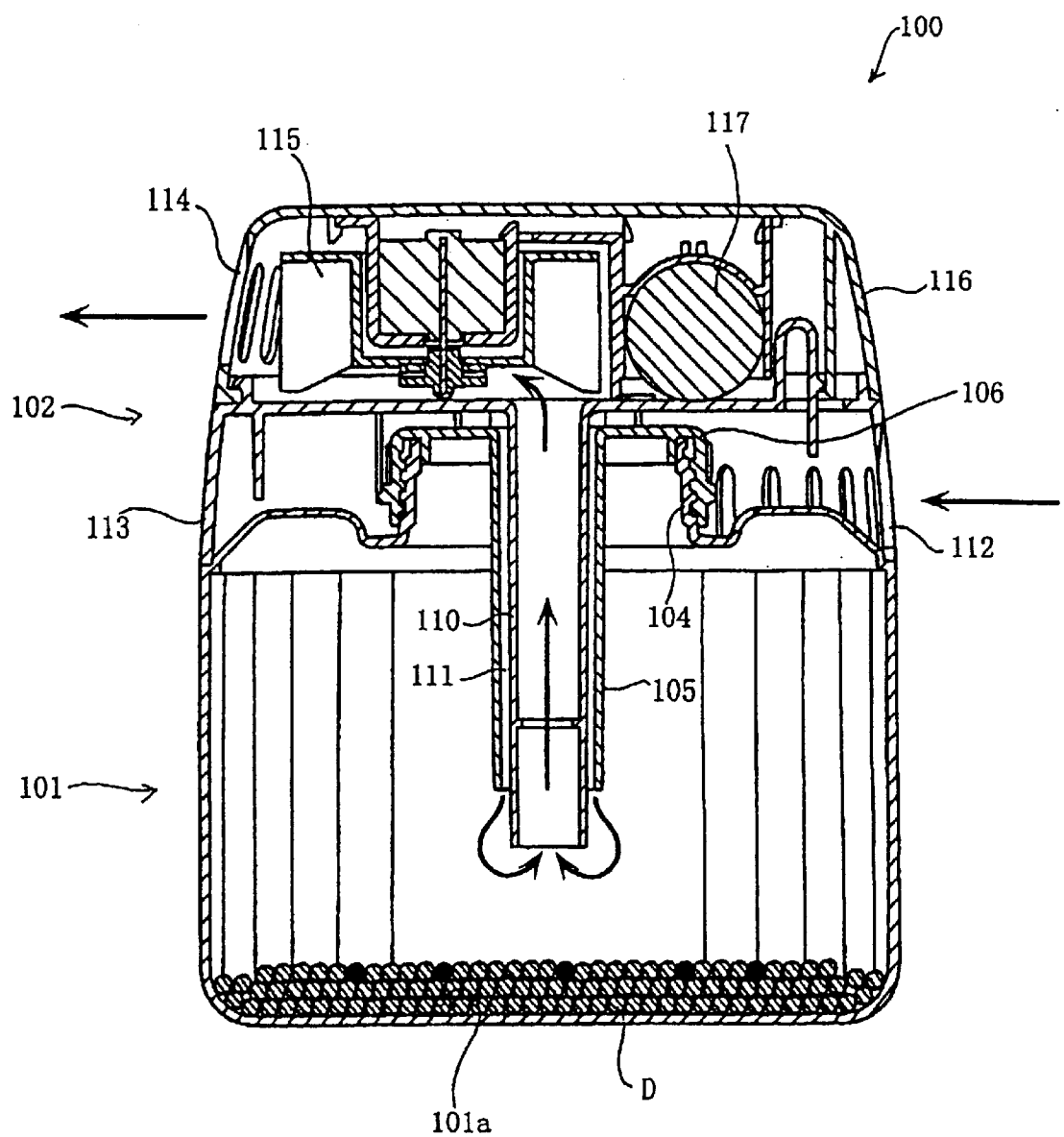

With this configuration, a first air passage 214a is defined by the first plate 208a, a operated in a closed box having a relative humidity of 80%;

FIG. 14 shows the relationship between the time (hour) in which the apparatuses were operated and the amount of the water vapor (g) in the closed box; and FIG. 15 is a schematic cross sectional view of a conventional dehumidification apparatus.

DETAILED DESCRIPTION OF THE PREFERRED EMBODIMENTS

The principle of the present invention will now be described based on schematic illustration of the important portion of a preferred embodiment of the dehumidification apparatus according to the present invention, shown in FIGS. 1 to 3.

Figure 1:
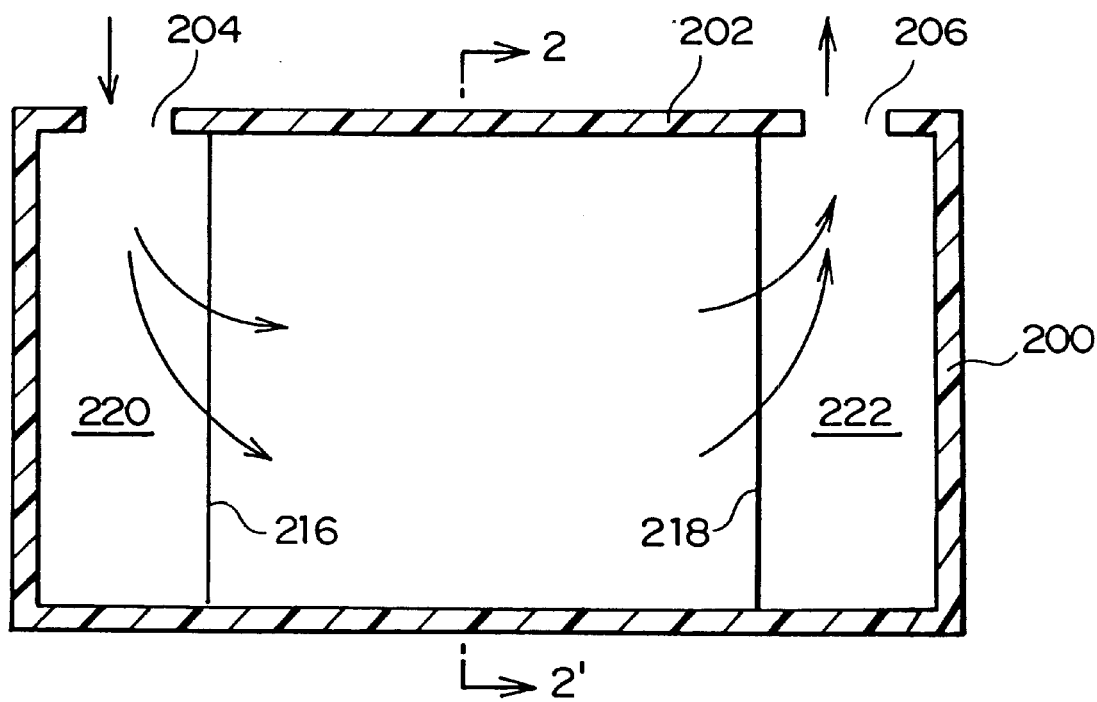
FIG. 1 is a schematic cross sectional front view of the container of the dehumidification apparatus according a preferred embodiment of the present invention.
Figure 3:
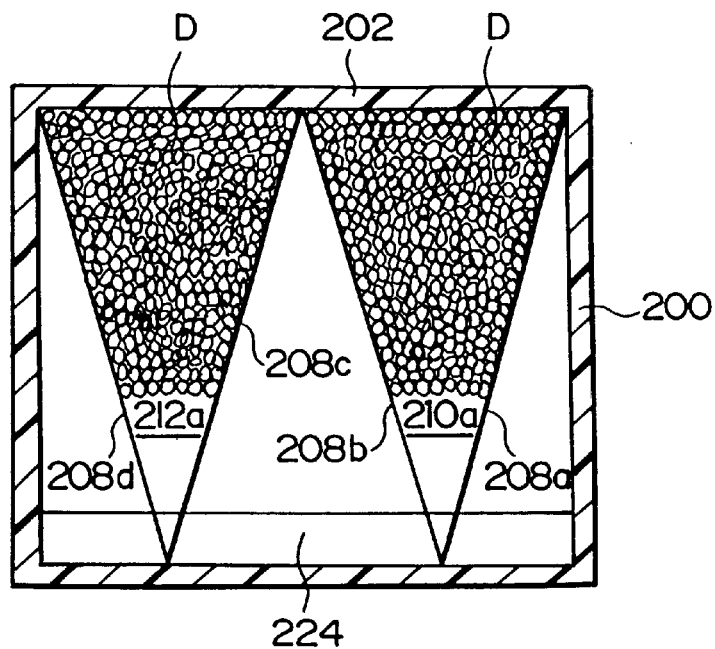
FIG. 3 is a schematic cross sectional side view as FIG. 2, which shows the state after the apparatus is used for a period of time.

It should be noted that a number of elements included in the actual apparatus are omitted in FIGS. 1 to 3 for the purpose of easier comprehension of the principle of the present invention.

FIG. 1 is a schematic cross sectional front view of the container of the dehumidification apparatus according a preferred embodiment of the present invention. FIG. 2 is a schematic cross sectional side view of the container of the dehumidification apparatus according to the preferred embodiment of the present invention shown in FIG. 1, cut along the 2—2' line shown in FIG. 1. FIG. 3 is a schematic cross sectional side view as FIG. 2, which shows the state after the apparatus is used for a period of time.

A container 200 of the dehumidification apparatus according to the present invention having an upper plate 202 covering the container 200 has at least one air inlet 204 and at least one air outlet 206. It is preferred to form the air inlet 204 and the air outlet 206 as far as possible so as to effectively utilize the inner space of the container 200 in which deliquescent dehumidification agent is contained. The distance between the center of the air inlet 204 and the center of the air outlet 206 may preferably be not less than 70%, more preferably not less than 80% of the inner side wall of the container 200 and the bottom of the container 200; a second air passage 214b is defined by the second plate 208b, the third plate 208c and the bottom of the container; and a third air passage 214c is defined by the fourth plate 208d, a side wall of the container and the bottom of the container.

Both open ends of the compartments 210 and 212 at the side of the air inlet 204 are closed by a first side plate 216 and the both open ends of the compartments 210 and 212 at the side of the air outlet 206 are closed by a second side plate 218. Thus, the four plates 208a–208d extend between the first and the second side plates 216, 218. By the first side plate 216 and a side wall of the container 200, an air-introducing chamber 220 is defined, which has the air inlet 204. Similarly, by the second side plate 218 and the opposite side wall of the container, an air-discharging chamber 222 having the air outlet 206 is defined. Each of the first and second side plates 216 and 218 have a plurality of through holes through which water and air can pass but the deliquescent dehumidification agent cannot pass. Alternatively, the first and the second side plates 216 and 218 may be solid plates which have openings that open to the air passages 214a to 214c.

In operation, the fan (not shown) is driven, so that air is drawn from the air inlet 204 into the air-introducing chamber 220. The air passes through the first side plate 216 and enters the air passages 214a, 214b and 214c. After passing through these passages, the air is discharged from the air outlet 206 via the air-discharging chamber 222.

During the air passes through the air passages 214a, 214b and 214c, the air contacts the deliquescent dehumidification agent held in the compartments 210 and 212 via the plurality of through holes formed in the plates 208a–208d, so that the moisture in the air is absorbed by the deliquescent dehumidification agent and air is dried. The dried air is discharged from the air outlet 206. In cases where the side plates 216 and 218 have a plurality of through holes, the air can also contacts the deliquescent dehumidification agent via the through holes in the side plates 216 and 218.

Since each of the compartments 210 and 212 is downwardly tapered, the amount of the deliquescent dehumidification agent is smaller in the lower region in the compartment than in the upper region in the compartment, and in turn, the surface area per a unit volume of the dehumidification agent is larger in the lower region in the compartment than in the upper region in the compartment. Therefore, after continuing the operation for a period of time, the deliquescent dehumidification agent at the lower region of each compartment firstly disappears, so that hollow regions 210a and 212a are formed at the bottom region of each compartment. Simultaneously, deliquesced liquid 224 formed by the deliquescence is accumulated on the bottom of the container. Even though the bottom regions 210a and 212a are hollowed, since the granules of the deliquescent dehumidification agent D held in the upper region of each compartment are agglutinated each other due to a small degree of deliquescence, and since each compartment is downwardly tapered, the deliquescent agent D held in the upper region of each compartment does not go down but retained in the original position. Therefore, the deliquescent dehumidification agent D is kept apart from the deliquesced liquid 224. Although the level of the deliquesced liquid 224 raises with time due to deliquescence, the lower end of the deliquescent dehumidification agent D held in the upper region of each compartment also raises because the dehumidification agent D disappears from its bottom end. Therefore, the deliquescent dehumidification agent D is always kept apart from the deliquesced liquid 224, even after substantially all of the dehumidification agent disappeared. In cases where the uppermost region of dehumidification agent D is immersed in the deliquesced liquid, the amount of the dehumidification agent may be decreased so as to assure that the uppermost region of dehumidification agent D is not immersed. That is, the dehumidification agent may not be packed into the The lower end of the guide pipe 16 opens in the lower surface 11b of the bottom at a prescribed diameter. The upper end of the guide pipe 16 is provided with a cylindrical portion 17 having a decreased diameter formed via a step portion 16a.

The container 2 contains a holder 3 which separates the inner space 30 of the container 2 into a plurality of compartments, and which can hold the granular dehumidification agent (not shown). The holder 3 is composed of nets (porous plates) made of a synthetic resin, whose mesh size is smaller than the granule size of the dehumidification agent. The holder 3 comprises two vertical plates 21 facing the shorter walls 13, and four slant plates 22 facing the longer walls 12.

Figure 8:
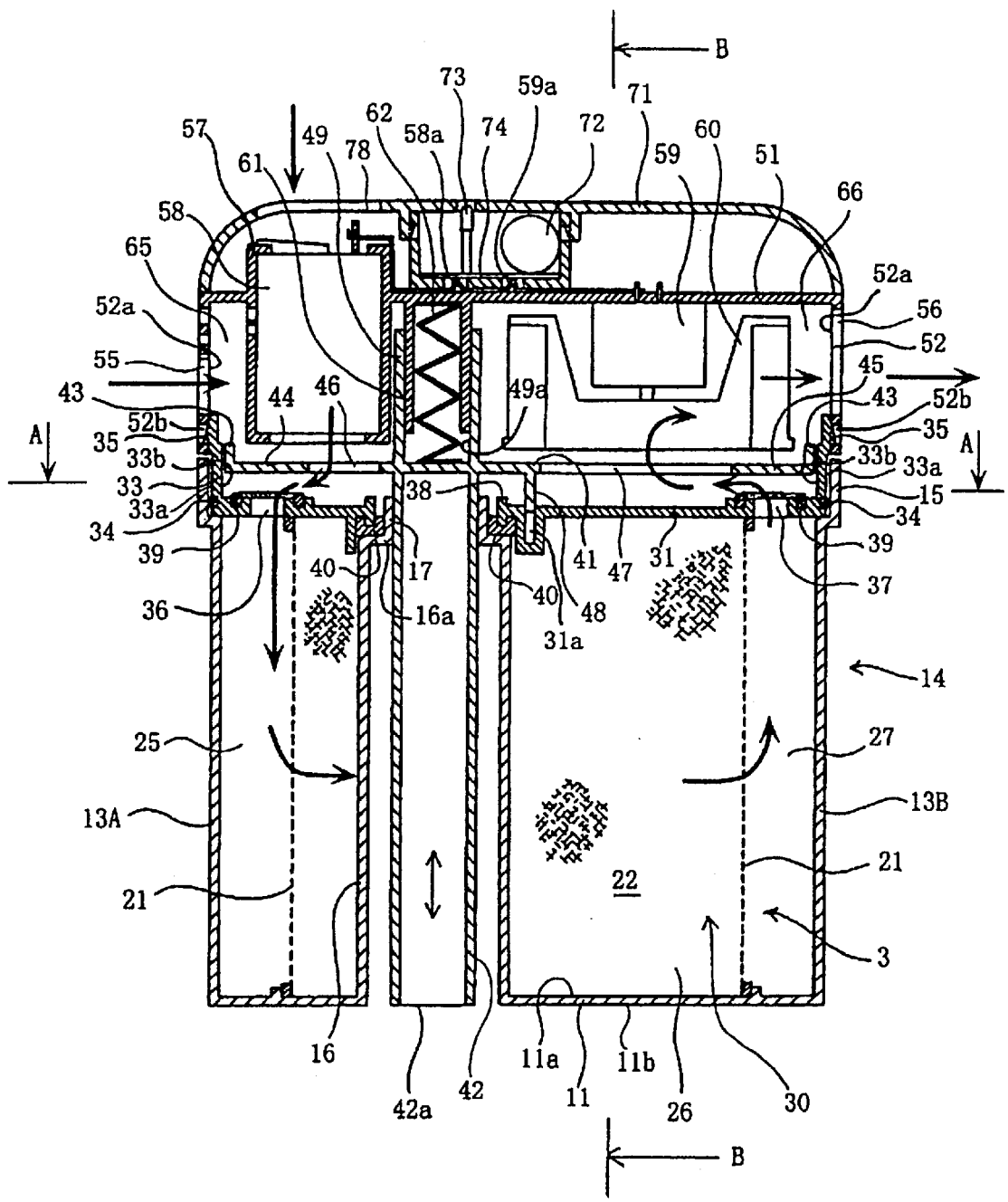
FIG. 8 is a schematic cross sectional front view shown in detail of a preferred embodiment according to the present invention.
Figure 9:
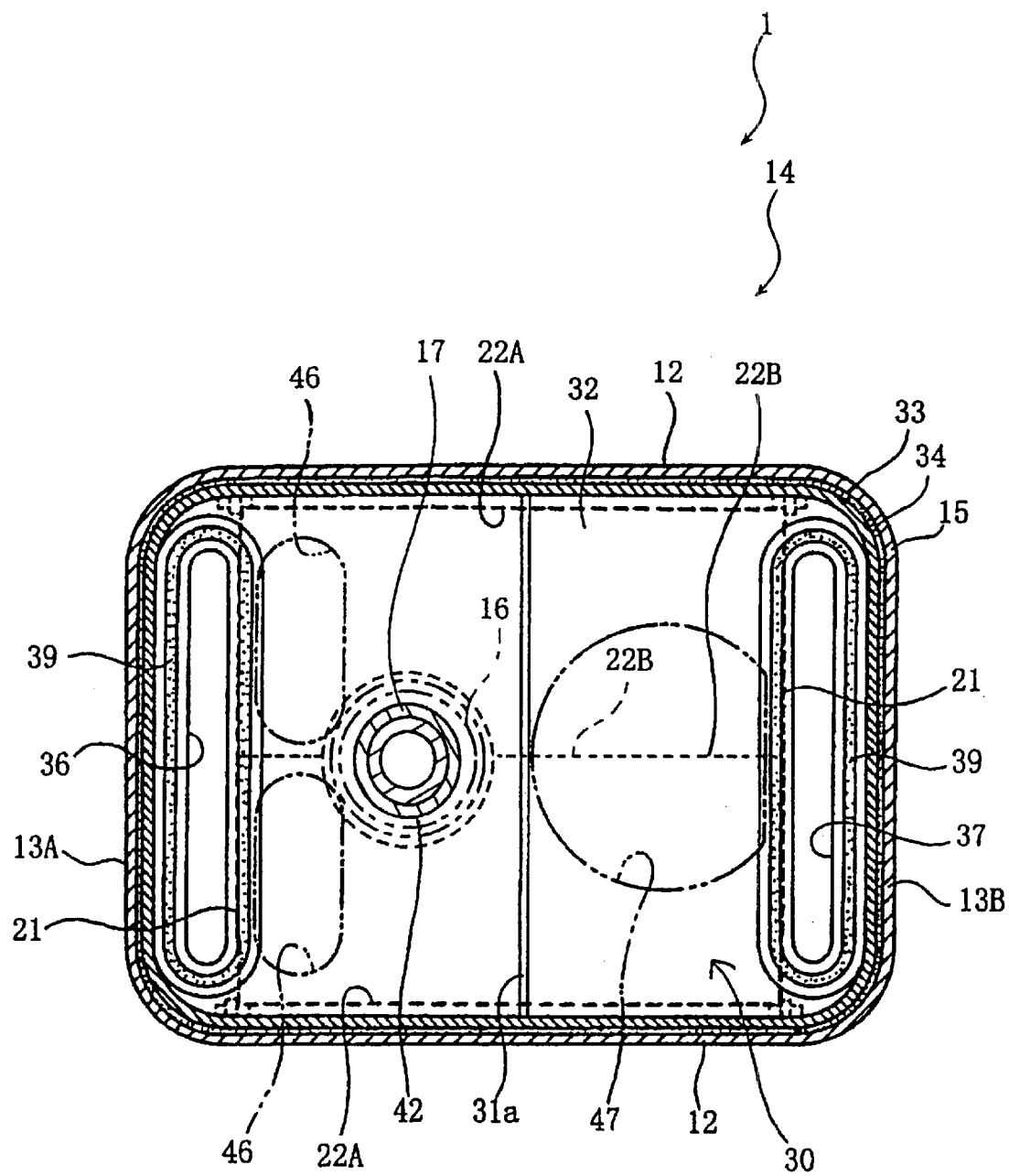
FIG. 9 is a schematic cross sectional plan view cut along the A—A line shown in FIG. 8.

As shown in FIGS. 8 and 9, the vertical plates 21 are parallel to the shorter walls 13 and span the longer walls 12. The vertical plates 21 stand up from the upper surface 1 a of the bottom of the container 2 and vertically extends up to the upper end of the body portion 14 of the container 2.

The slant plates 22 are arranged between the vertical plates 21 such that the slant plates 22 form W-shaped configuration. More particularly, the slant plates 22 includes outer slant plates 22A. The upper end of each outer slant plate 22A is coincide with the upper end of the respective longer wall 12, and the lower end of each outer slant plate 22A is on the upper surface 11a of the bottom of the container. Each outer slant plate 22A is arranged such that the lower the position in the outer slant plate 22A, the farther from the respective longer wall 12. The slant plate 22 also includes inner slant plates 22B each of whose upper end is attached to the center between the longer walls 12 and each of whose lower end is on the upper surface 11a of the bottom of the container 2. Each inner slant plate 22B is arranged such that the lower the position in the lower slant plate 22B, the closer to the respective longer wall 12.

In the inner space 30, the holder 3 forms an air-introducing chamber 25 between one of the vertical plates 21 and a shorter wall 13A and an air-discharging vertical plate 208d. In this case, air passages 214a, 214b and 214c are defined.

Figure 7:
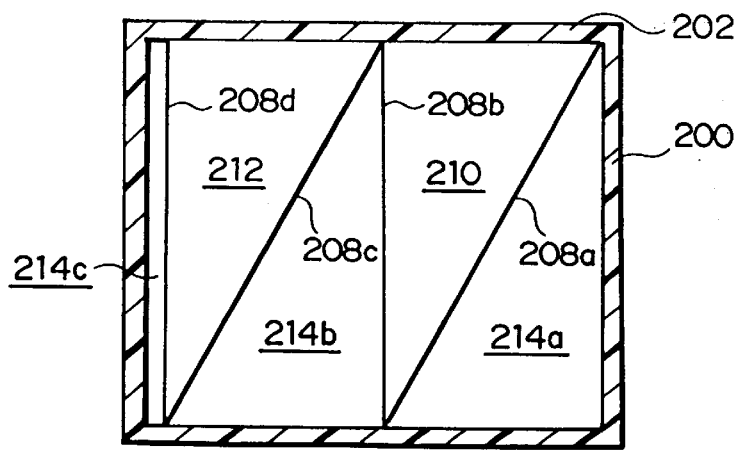
FIG. 7 is a schematic cross sectional side view of the container of the dehumidification apparatus according to a still another preferred embodiment of the present invention.

In the embodiment shown in FIG. 7, a first downwardly tapered compartment 210 is defined by a slant plate 208a and a vertical plate 208b, and a second downwardly tapered compartment 212 is defined by a slant plate 208c and a vertical plate 208d. In this case, air passages 214a 214b and 214c are defined.

Although not shown, the lower ends of the two plates defining a downwardly tapered compartment may not contact each other so as to define a compartment having a cross sectional shape of a reversed trapezoid, as long as it is assured that the dehumidification agent does not go down when the hollow region is formed at the bottom of the compartment.

Figure 10:
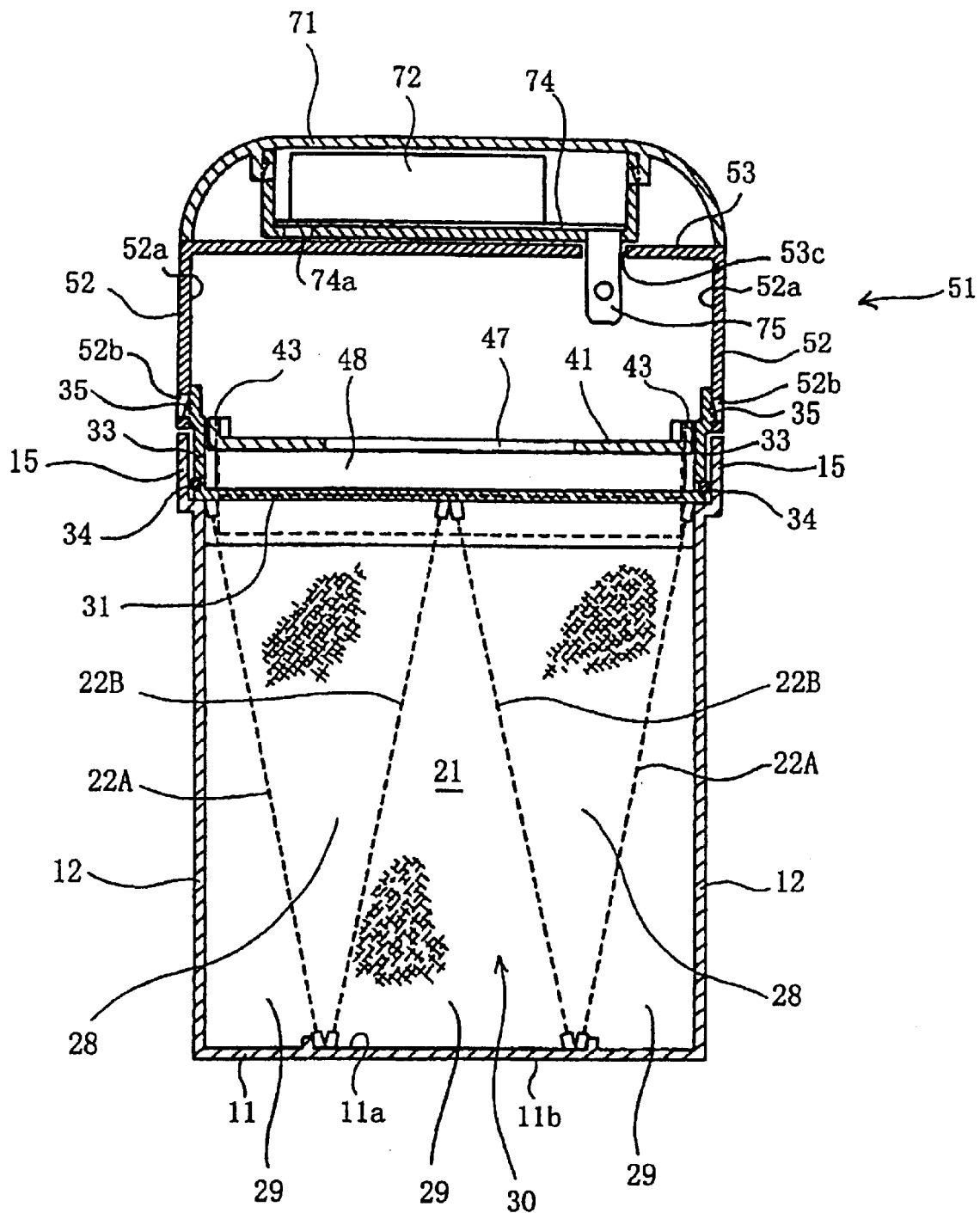
FIG. 10 is a schematic cross sectional side view cut along the B—B line shown in FIG. 8.

A preferred embodiment of the dehumidification apparatus according to the present invention will now be described in more detail referring to FIGS. 8–12. FIG. 8 is a schematic cross sectional front view of the second preferred embodiment according to the present invention; FIG. 9 is a schematic cross sectional plan view cut along the A—A line shown in FIG. 8; and FIG. 10 is a schematic cross sectional side view cut along the B—B line shown in FIG. 8.

A dehumidification apparatus 1 comprises a container 2 in which a deliquescent dehumidification agent is contained and an outer cover 51 mounted on the container 2.

The container 2 has a substantially rectangular bottom 11 and a body portion 14 comprised of longer walls 12 and shorter walls 13, which walls extend from the periphery of the bottom 11. A fitting portion 15 is formed on the upper end of the body portion 14. The fitting portion 15 comprises an outwardly extending section which extends toward the outside of the container and a section having a prescribed height which extends upright from the periphery of the outwardly extending section.

In the vicinity of the center of the container 2, a cylindrical guide pipe 16 extending from the bottom 11 to the upper end of the body portion 14 is provided. compartment up to the upper plate 202, so that an open space may be formed between the upper plate 202 and the upper surface of the dehumidification agent.

The angle θ at the tapered bottom of the compartments 210 and 212 may preferably be 15 to 75° to assure that upper region of the dehumidification agent D does not go down when the hollow regions 210a and 212a are formed.

In the preferred embodiment described above, the upper ends of the plates 208a–208d are attached to the upper plate 202. However, the upper ends of the plates 208a–208d may not be attached to the upper plate 202, but may end at lower positions. This may be attained by attaching the side ends of the plates 208a–208d to the side plates 216, 218, or by employing self-supporting plates. However, to effectively utilize the inner space of the container, the height of the holder 208 may preferably be not less than 60%, more preferably not less than 70% of the inner height of the container 200.

Other examples of the configurations of the holder 208 are shown in FIGS. 4–7.

Figure 4:
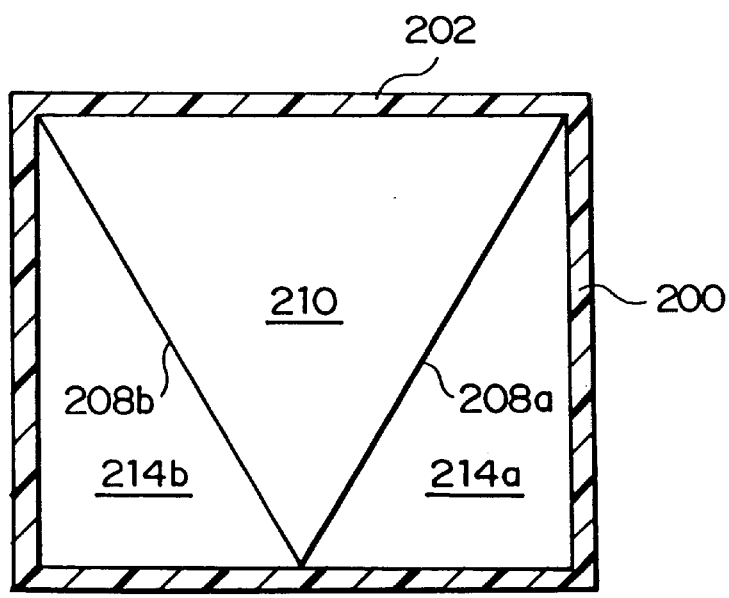
FIG. 4 is a schematic cross sectional side view of the container of the dehumidification apparatus according to another preferred embodiment of the present invention.

In the embodiment shown in FIG. 4, a downwardly tapered compartment 210 is defined by two slant plates 208a and 208b. In this embodiment, only one compartment 210 is defined in the container 200 and two air passages 214a and 214b are defined.

Figure 5:
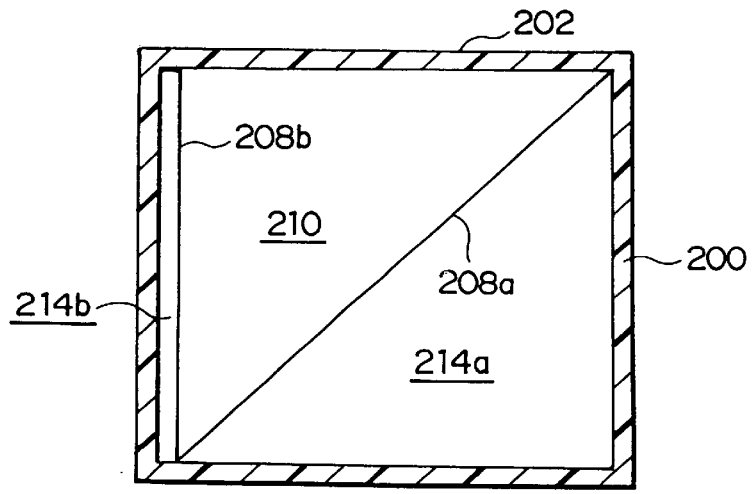
FIG. 5 is a schematic cross sectional side view of the container of the dehumidification apparatus according to a still another preferred embodiment of the present invention.

In the embodiment shown in FIG. 5, a downwardly tapered compartment 210 is defined by a slant plate 208a and a vertical plate 208b. Even with this configuration, a downwardly tapered compartment 210 is defined. Thus, only one plate may be slant. In this case, an air passage 214a is defined, and a thin air passage 241b is defined between the vertical plate 208b and a side wall of the container is also defined.

Figure 6:
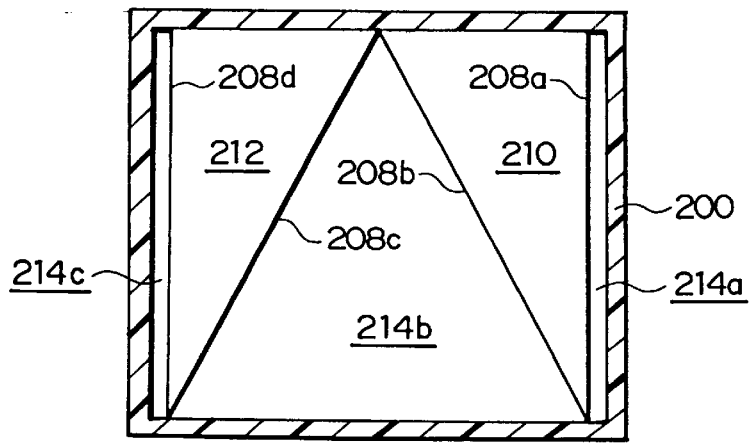
FIG. 6 is a schematic cross sectional side view of the container of the dehumidification apparatus according to a still another preferred embodiment of the present invention.

In the embodiment shown in FIG. 6, a first downwardly tapered compartment 210 is defined by a vertical plate 208a and a slant plate 208b, and a second downwardly tapered compartment 212 is defined by a a slant plate 208c and a chamber 27 between the other vertical plate 21 and the other shorter wall 13B.

The holder 3 gives, between the vertical plates 21, dehumidification agent-holding chambers 28 in which the dehumidification agent is held and air passage chambers 29 through which air passes. As shown in FIG. 10, each dehumidification agent-holding chamber 28 is in the form of a wedge projecting downwardly, which chamber 28 is delimited by the outer slant plate 22A and the inner slant plate 22B. Each of the air passage chambers 29 is in the form of mountain projecting upwardly, which chamber 29 is delimited by the both inner slant plates 22B or by the outer inner slant plate 22A and the vertical plate 21.

The dehumidification agent held in the dehumidification agent-holding chamber 28 is granular calcium chloride or the like which deliquesces by absorbing moisture in the air. The dehumidification agent is supplied from the upper side to the dehumidification agent-holding chamber 28 and retained in the form of a wedge projecting downwardly.

That is, the dehumidification agent is retained such that it faces the air passage chamber 29 at the outer slant plates 22A and inner slant plates 22B, and faces the air-introducing chamber 25 and the air-discharging chamber 27 at the vertical plates 21. As shown in FIG. 9, in the inner slant plates 22B of the holder 3, an opening for penetrating the guide pipe 16 is formed.

An intermediate cover 31 (upper plate) is fitted to the upper end of the container 2, so that the inner space 30 is delimited by the container 2 and the intermediate cover 31. The intermediate cover 31 has a planar portion 32 which closes the upper opening of the container 2 and a peripheral wall 33 which stands up from the periphery of the planar portion 32, and which is taller than the fitting portion 15.

A packing 34 is mounted on the outer surface 33a of the peripheral wall 33, which packing 34 is for sealing the fitting portion 15 and the peripheral wall 33 in the fitted state. On the upper end of the peripheral wall 33, a fitting portion 35 for fitting to the outer cover 51 is formed.

In the planar portion 32, an air inlet 36 is formed on the air-introducing chamber 25 and an air outlet 37 is formed on the air-discharging chamber 27. In the planar portion 32, a through hole 38 is formed between the air inlet 36 and the air outlet 37, at the position corresponding to the guide pipe 16.

As shown in FIG. 9, the air inlet 36 and the air inlet 37 have an elongated shape extending between the longer walls 12. On the upper edge of each of the air inlet 36 and the air outlet 37, a ring-shaped packing 39 is mounted. The packing 39 is formed on the planar portion 32 such that it protrudes toward the upper direction. The packing 39 water-tightly closes the air inlet 36 or the air inlet 37 when being contacted with a closing member described below. A packing 40 is mounted between the through hole 38 and the cylindrical portion 17 so as to prevent communication between the inner side of the container 2 and the space above the intermediate cover 31.

Above the intermediate cover 31, a closing member 41 is arranged. The closing member 41 is in the form of a plate which entirely cover the intermediate cover 31. On the lower surface of the closing member 41, a rod (movable member) 42 to be inserted into the guide pipe 16 is vertically formed. The rod 42 is inserted in the cylindrical portion 17 of the guide pipe 16 such that the rod 42 can reciprocally move in the axial direction thereof. The rod 42 has a length with which the distal portion 42a thereof is protruded from the bottom of the lower surface 11b of the bottom of the container 2 by a prescribed length when the closing member 41 contacts the intermediate cover 31.

On the periphery of the closing member 41, a small rib 43 is formed upright which slidably contacts the inner surface 33b of the peripheral wall 33. Thus, the closing member 41 can be moved in the vertical direction by virtue of the guidance of the rod 42 by the cylindrical portion 17 and by the guidance of the small rib 43 by the inner surface 33b.

The closing member 41 has an inlet-closing portion 44 which closes the air inlet 36 and an outlet-closing portion 45 which closes the air outlet 37 when the closing member 41 contacts the intermediate cover 31. The closing member 41 has an air-introducing opening 46 between the inlet-closing portion 44 and the rod 42, and an air-discharging opening 47 between the outlet-closing portion 45 and the rod 42.

As shown in FIG. 9, the air-introducing opening 46 has substantially the same shape and the same area as the air inlet 36 and the air-discharging opening 47 is in the form of a circle having substantially the same diameter with the diameter of the fan 60.

On the lower surface of the closing member 41, a lower partition plate 48 which separates the space between the closing member 41 and the intermediate cover 31 into an air-introducing side and an air-discharging side, is formed. The lower partition plate 48 extends in the direction perpendicular to the longer walls 12 and spans the opposite portions of the periphery wall 33. The lower partition plate 48 is vertically formed and is always inserted in a groove 31a formed in the intermediate cover 31 irrespective of the position of the closing member 41 which vertically moves.

On the upper surface of the closing member 41, a guide rod 49 is vertically formed, which is guided vertically by the outer cover 51. Above the intermediate cover 31, the outer cover 51 which continues to the upper end of the container 2 is mounted. The outer cover 51 has an outer wall 52 having a prescribed height and located on the fitting portion 15 and a ceiling portion 53 which closes the upper opening formed by the outer wall 52. Thus, between the outer cover 51 and the intermediate cover 31, an inner space is provided. The outer cover 51 is mounted on the container 2 by fitting a recessed fitting portion 52b formed at the lower position of the inner surface 52a of the outer wall 52 and the fitting portion 35 of the periphery wall 33 of the intermediate cover 31.

The outer wall 52 has an air-introducing hole 55 above the shorter wall 13A and an air-discharging hole 56 above the shorter wall 13B. In the air-introducing side, a bracket 57 is formed on the ceiling portion 53 and a humidity sensor which senses the humidity of the air is harbored therein. In the air-discharging side, an electric motor 59 is hung on the ceiling portion 53 such that the rotation axis is downwardly directed. A fan 60 is mounted on the rotation axis.

Between the bracket 57 and the electric motor 59, a guide shaft 61 for guiding the guide rod 49 is formed on the lower surface of the ceiling portion 53 of the outer cover 51. The guide shaft 61 has an outer diameter with which the guide shaft 61 can slidably move in the vertical direction sliding on the inner surface 49a of the guide rod 49. A spring 62 downwardly urging the rod 42 is enclosed in the guide shaft 61.

Figure 11:
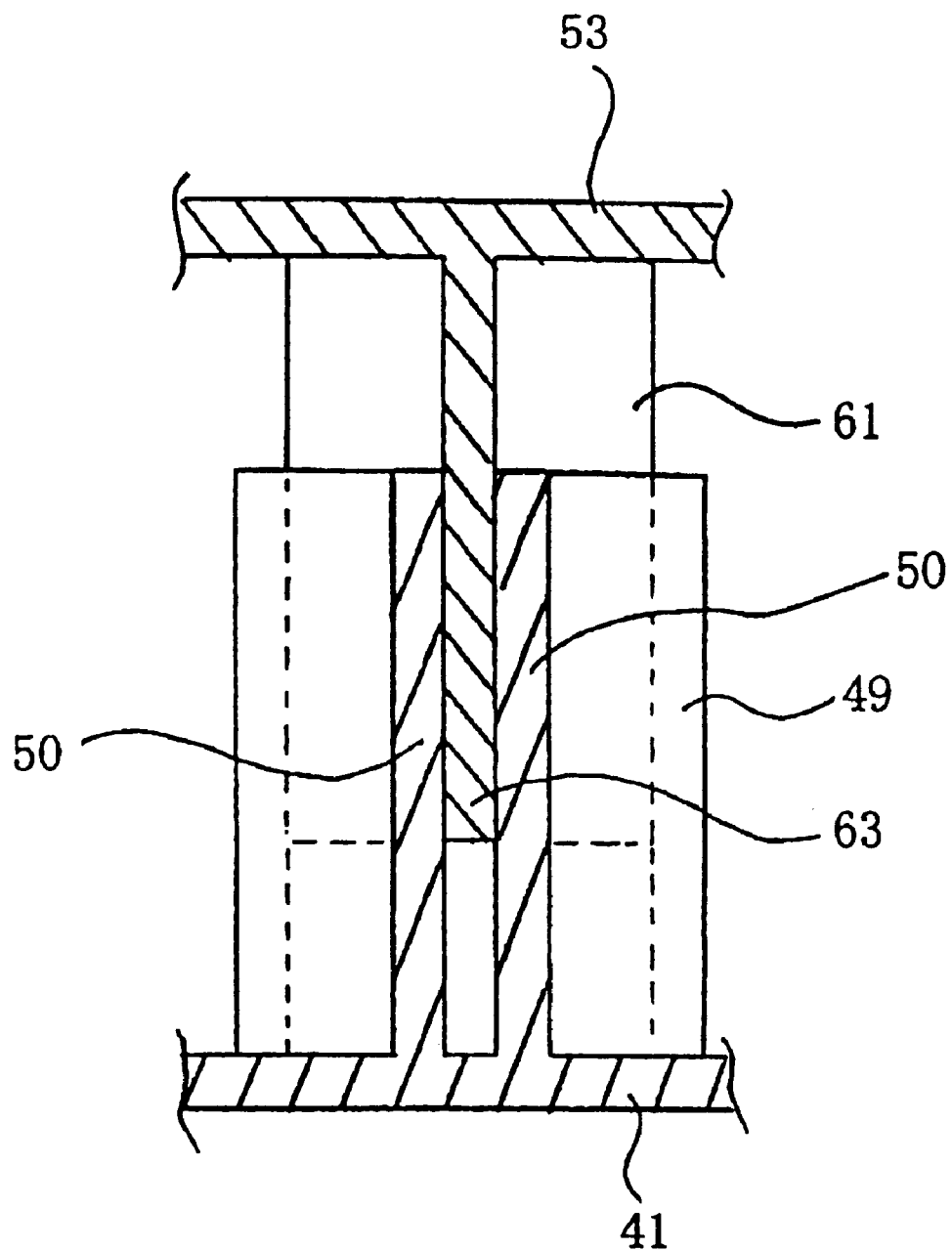
FIG. 11 is a schematic enlarged cross sectional view of the region in the vicinity of the guide shaft viewed from the longer wall.
Figure 12:
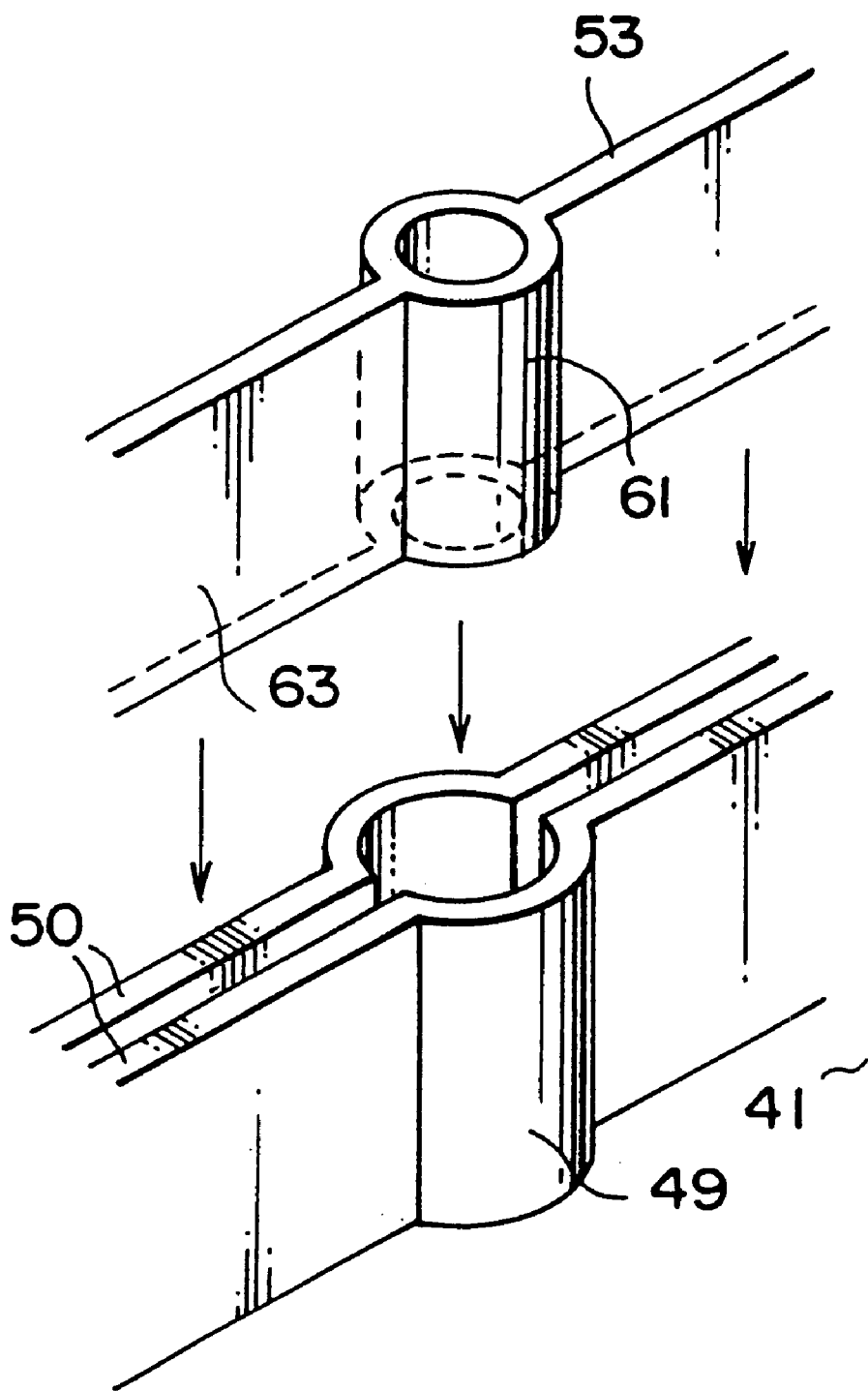
FIG. 12 is a schematic perspective view of the region shown in FIG. 11.

FIG. 11 is a schematic enlarged cross sectional view of the region in the vicinity of the guide shaft 61 viewed from the longer wall 12 and FIG. 12 is a schematic perspective view thereof. On the lower surface of the ceiling portion 53, an upper partition plate 63 is formed, which separates the inner space formed between the closing member 41 and the ceiling portion 53 into an air-introducing side and an air-discharging side. The upper partition plate 63 extends from the guide shaft 61 to the outer wall 52 in the direction perpendicular to the longer wall 12.

The upper partition plate 63 is always slidably inserted in the gap between the two walls 50 formed on the closing member irrespective of the position of the closing member 41 which vertically moves. Thus, the inner space formed between the outer cover 51 and the intermediate cover 31 is separated into an air-introducing room 65 and an air-discharging room 66 by the lower partition plate 48 and the upper partition plate 63. The spring 62 (not shown in FIGS. 11 and 12) is held in the space in the guide shaft (see FIG. 12).

As shown in FIG. 8, a detachable cover 71 in the form of a reversed bowl is mounted on the outer cover 51. The detachable cover 71 harbors a rechargeable battery 72, a lamp 73 indicating the charging condition and a substrate 74 having a charging circuit. The detachable cover 71 is mounted on the outer cover 51 by inserting an attachment plug 75 downwardly projecting from the lower side of the substrate 74 into a plug-fitting hole 53c formed in the ceiling portion 53 of the outer cover 51.

The attachment plug 75 has the shape which can be inserted in a domestic plug socket (not shown) and the battery 72 is charged by inserting the attachment plug 75 into a domestic plug socket by virtue of the charging circuit formed on the substrate 74.

On the lower surface of the substrate 74, a contact 74a is formed separately from the attachment plug 75. When the detachable cover 71 is mounted on the outer cover 51, the contact 74a contacts connecting terminals 58a, 59a protruding on the ceiling portion 53 to a prescribed height so that the battery 72 is connected to the humidity sensor 58 and the electric motor 59.

In the detachable cover 71, a slit 78 is opened above the humidity sensor 58 mounted on the outer cover 51, so that air is introduced also from the upper side of the detachable cover 71.

In operation, by placing the dehumidification apparatus 1 on a plane in the normal position, the rod 42 downwardly protruding from the lower surface 11b of the bottom of the container 2 is pushed into the container 2 overcoming the urging force generated by the spring 62.

By this movement of the rod 42, the closing member 41 is moved in the direction apart from the intermediate cover 31, so that the air inlet 36 and the air outlet 37 are opened (the state shown in FIG. 8). If the humidity measured by the humidity sensor 58 is higher than the prescribed humidity selected by the user, power is supplied from the battery 72 to the electric motor 59, so that the fan 60 is rotated.

By rotation of the fan 60, the air in the inner space 30 is discharged from the air-discharging hole 56 and the ambient air is drawn from the air-introducing hole 55. Thus, as shown by the thick arrows shown in FIG. 8, air is compulsively drawn from the air-introducing hole 55 and then discharged from the air-discharging hole 56 after passing through the air-introducing opening 46, the air inlet 36, the inner space 30, the air outlet 37 and the air-discharging opening 47 in the order mentioned.

During the passing through the inner space 30, the air contacts the dehumidification agent held in the holder 3 at the outer slant plates 22A and the inner slant plates 22B as well as at the vertical plates 21. Thus, the air can contact the dehumidification agent at wide area, so that the moisture in the air is well absorbed by the dehumidification agent. Therefore, the dehumidification ability of the dehumidification agent contained in the container is utilized maximally so that the dehumidification efficiency can be largely increased.

In cases where the dehumidification apparatus 1 is tumbled or the like, the bottom 11 of the container 2 becomes apart from the plane (not shown) on which the apparatus 1 was placed, and the rod 42 pushed into the container 2 protrudes from the lower surface 11b of the container 2 by virtue of the urging force given by the spring 62.

By this movement of the rod 42, the closing member 41 fixed to the rod 42 also moves together with the rod 42 so that the closing member 41 is pressed on the upper surface of the intermediate cover 31. By this, the air inlet 36 and the air outlet 37 are closed with the inlet-closing portion 44 and the outlet-closing portion 45, respectively, via the packing 39, so that the communication between the inner space 30 and the outside thereof is cut. Therefore, leakage of the deliquesced liquid accumulated in the inner space 30 to the outside is securely prevented.

Since the air inlet 36 and the air outlet 37 are formed in the intermediate cover 31, the deliquesced liquid may be accumulated up to a higher level in the container. Therefore, the inner space can be made small, so that the entire dehumidification apparatus 1 can be compacted.

The air inlet 36 and the air outlet 37 having large area can be formed at locations which are most apart from each other. Therefore, a large amount of air can be flown through the inner space 30 for a long distance, during which the air contacts the dehumidification agent at the under side or lateral side of the dehumidification agent. Therefore, a large amount of air can contact the dehumidification agent, so that the dehumidification ability of the dehumidification agent contained in the container is utilized maximally so that the dehumidification efficiency can be largely increased.

An experiment for showing the dehumidification ability of the dehumidification apparatus according to the present invention was carried out in comparison with a conventional dehumidification apparatus. The dehumidification apparatus according to the present invention was that shown in FIGS. 8 to 12, and the conventional dehumidification apparatus was that shown in FIG. 15. The containers of the both apparatuses had an inner volume of 0.1089 $m^3$, and contained 170 g of calcium chloride granules as the dehumidification agent, respectively. The electric power supplied to the apparatus of the present invention was 5.9 mW·h and that supplied to the conventional apparatus was 7.8 mW·h. The results are shown in FIGS. 13 and 14.

Figure 13:
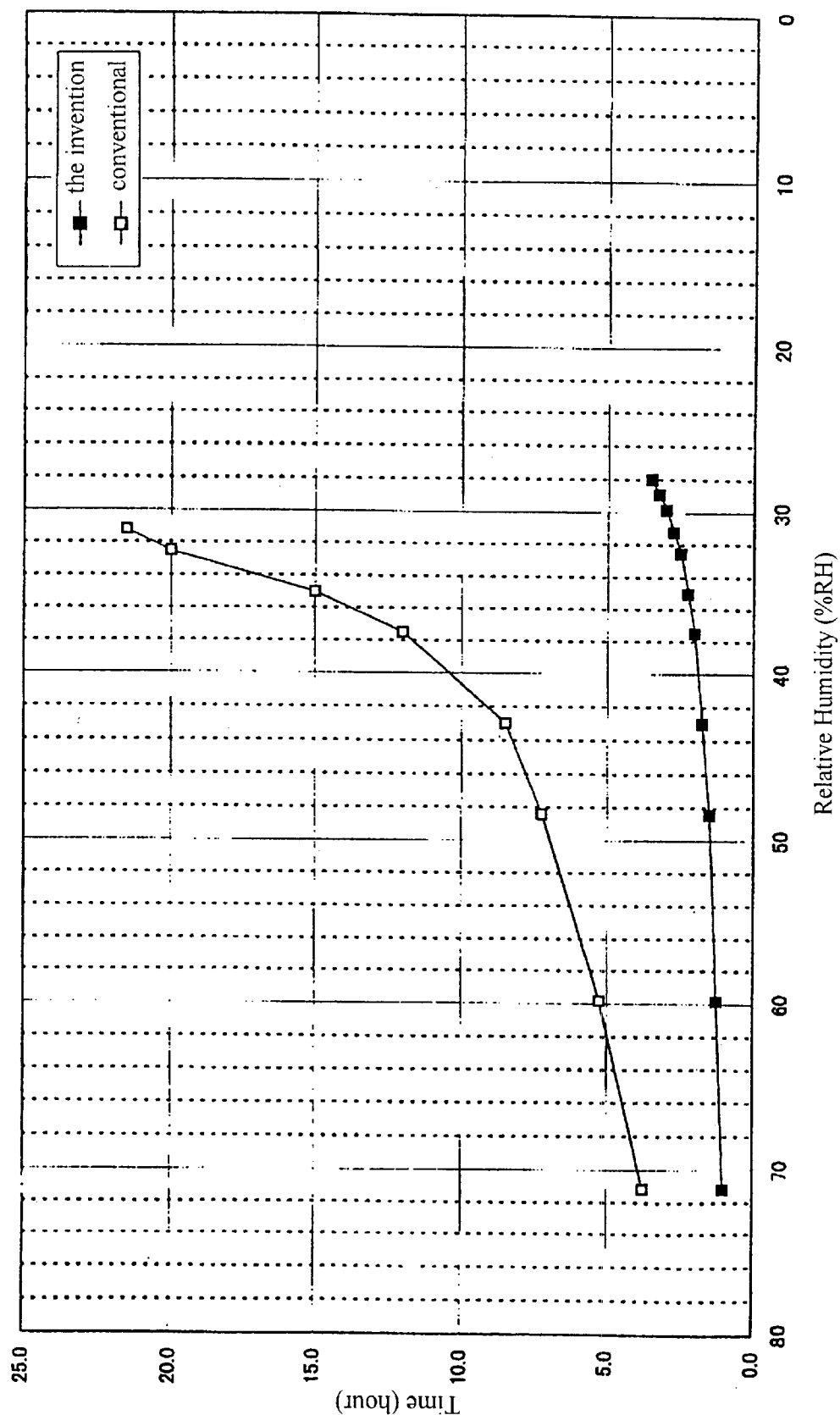
FIG. 13 shows the relationship between the final relative humidity (%) and the time (hour) required to attain the final relative humidity when the apparatuses were width of the container 200 (i.e., inner length between the opposite walls shown in FIG. 1 of the container 200). The dehumidification apparatus comprises a fan (not shown) driven by a motor (not shown), which introduces air into the container 200 from the air inlet 204 and discharges air from the container 200 through the air outlet 206 so that air flow (shown by arrows in FIG. 1) passing through the container 200 is formed.

FIG. 13 shows the relationship between the final relative humidity (%) and the time (hour) required to attain the final relative humidity when the apparatuses were operated in a closed box having a relative humidity of 80%.

As shown in FIG. 13, by using the conventional apparatus, it took more than 10 hours to decrease the relative humidity to 40%, while it took only about 2 hours by using the apparatus according to the present invention.

FIG. 14 shows the relationship between the time (hour) in which the apparatuses were operated and the amount of the water vapor (g) in the closed box.

As shown in FIG. 14, the amount of the water vapor was much more rapidly decreased by using the apparatus according to the present invention than by using the conventional apparatus.

We claim:

1. A dehumidification apparatus comprising:
a container having at least one air inlet and at least one air outlet, and has an upper plate covering the container;
a fan driven by a motor, which introduces air into said container from said air inlet and discharges air from said container through said air outlet so that air flow passing through said container is formed; and
a holder for holding deliquescent dehumidification agent, which holder is contained in said container, which holder has at least one downwardly tapered compartment in which said deliquescent dehumidification agent is held, said deliquescent dehumidification agent held in said compartment contacts said air flow via through holes through which water and air can pass but said deliquescent dehumidification agent cannot pass, said through holes being formed in outer boundary of said compartment.

2. The dehumidification apparatus according to claim 1, wherein each of said at least one compartment is defined by two plates, each of said plates having a plurality of through holes through which water and air can pass but said deliquescent dehumidification agent cannot pass, said two plates are arranged along the direction of said air flow, at least one plate among said two plates being slant such that said compartment between said two plates has a downwardly tapered cross section when viewed from the direction of said air flow, and that at least one air passage is defined by said slant plate and a side wall of said container or the other plate, through which said air flow passes, said deliquescent dehumidification agent held in said compartment contacts said air flow via said through holes in said two plates.

3. The dehumidification apparatus according to claim 2, wherein lower ends of said two plates defining one compartment contact each other at the bottom of said container.

4. The dehumidification apparatus according to claim 2, wherein said holder has not less than three said plates so that not less than two said compartments are defined.

5. The dehumidification apparatus according to claim 3, wherein said compartments cooperatively have a W-shaped cross section when viewed from the direction of said air flow.

6. The dehumidification apparatus according to any one of claims 2, wherein said through holes are in the form of slits.

7. The dehumidification apparatus according to claim 2, further comprising a first side plate which closes an open end of each of said at least one compartment, an air-introducing chamber being defined between a side wall of said container and said first side plate, which air-introducing chamber has said at least one air inlet, and a second side plate which closes the other open end of each of said at least one compartment, an air-discharging chamber being defined between a side wall of said container and said second side plate, which air-discharging chamber has said at least one air outlet, said air-introducing chamber and said air-discharging chamber communicating said air passage.

8. The dehumidification apparatus according to claim 7, wherein said first and second side plates have a plurality of through holes through which water and air can pass but said deliquescent dehumidification agent cannot pass.

9. The dehumidification apparatus according to any one of claims 1–8, wherein said compartment has a height of not less than 60% of the inner height of said container.

* * * * *